United States Patent
Kothari et al.

(10) Patent No.: US 12,264,243 B2
(45) Date of Patent: Apr. 1, 2025

(54) BIAXIALLY ORIENTED FORMABLE POLYESTER FILM

(71) Applicant: Polyplex Corporation Limited, Noida (IN)

(72) Inventors: Pranay Kothari, Noida (IN); Krishna Reddy, Noida (IN)

(73) Assignee: Polyplex Corporation Limited, Noida (IN)

( * ) Notice: Subject to any disclaimer, the term of this patent is extended or adjusted under 35 U.S.C. 154(b) by 455 days.

(21) Appl. No.: 17/266,953

(22) PCT Filed: May 22, 2019

(86) PCT No.: PCT/IN2019/050406
§ 371 (c)(1),
(2) Date: Feb. 8, 2021

(87) PCT Pub. No.: WO2020/031197
PCT Pub. Date: Feb. 13, 2020

(65) Prior Publication Data
US 2021/0301126 A1     Sep. 30, 2021

(30) Foreign Application Priority Data
Aug. 9, 2018 (IN) .............................. 201811029971

(51) Int. Cl.
*C08L 67/02* (2006.01)
*B29C 48/00* (2019.01)
(Continued)

(52) U.S. Cl.
CPC .......... *C08L 67/02* (2013.01); *B29C 48/0018* (2019.02); *B29C 48/022* (2019.02); *B29C 48/08* (2019.02); *B29C 48/914* (2019.02); *B29C 55/005* (2013.01); *B29C 55/14* (2013.01); *B29C 71/02* (2013.01); *B32B 7/12* (2013.01); *B32B 15/09* (2013.01); *B32B 15/20* (2013.01); *B32B 27/08* (2013.01); *B32B 27/20* (2013.01);
(Continued)

(58) Field of Classification Search
CPC ............ B32B 27/36; C08L 67/02; C08K 3/36
See application file for complete search history.

(56) References Cited

U.S. PATENT DOCUMENTS 3,871,947 A       3/1975 Brekken
10,639,873 B1 *   5/2020 Murga .................... B32B 27/20
(Continued)

FOREIGN PATENT DOCUMENTS

WO   WO-2006112836 A1 * 10/2006 ............. B32B 27/08
WO   WO-2014208519 A1 * 12/2014 ............. B29C 48/08

OTHER PUBLICATIONS

Machine Translation of WO 2014/208519 (Year: 2014).*
(Continued)

*Primary Examiner* — Zachary M Davis
(74) *Attorney, Agent, or Firm* — Sheppard Mullin Richter & Hampton LLP

(57) ABSTRACT

The present invention relates to a biaxially oriented formable polyester film having A/B/A layer structure and the process of preparing the same. The biaxially oriented formable polyester films exhibit improved Dart impact, elongation and formability comparable to nylon film which are used for thermoforming and cold forming applications.

36 Claims, 1 Drawing Sheet

Transversal section view of the biaxially oriented formable polyester film

(51) Int. Cl.

| | | |
|---|---|---|
| | *B29C 48/08* | (2019.01) |
| | *B29C 48/88* | (2019.01) |
| | *B29C 55/00* | (2006.01) |
| | *B29C 55/14* | (2006.01) |
| | *B29C 71/02* | (2006.01) |
| | *B32B 7/12* | (2006.01) |
| | *B32B 15/09* | (2006.01) |
| | *B32B 15/20* | (2006.01) |
| | *B32B 27/08* | (2006.01) |
| | *B32B 27/20* | (2006.01) |
| | *B32B 27/36* | (2006.01) |
| | *B65D 65/40* | (2006.01) |
| | *C08J 5/18* | (2006.01) |
| | *C08J 7/04* | (2020.01) |
| | *C08J 7/044* | (2020.01) |
| | *B29K 67/00* | (2006.01) |
| | *B29K 509/02* | (2006.01) |
| | *B29L 7/00* | (2006.01) |
| | *B29L 31/00* | (2006.01) |

(52) U.S. Cl.
CPC .............. *B32B 27/36* (2013.01); *B65D 65/40* (2013.01); *C08J 5/18* (2013.01); *C08J 7/0427* (2020.01); *C08J 7/044* (2020.01); *B29C 2071/022* (2013.01); *B29K 2067/003* (2013.01); *B29K 2509/02* (2013.01); *B29L 2007/008* (2013.01); *B29L 2031/712* (2013.01); *B32B 2250/03* (2013.01); *B32B 2250/244* (2013.01); *B32B 2250/40* (2013.01); *B32B 2255/10* (2013.01); *B32B 2255/20* (2013.01); *B32B 2255/26* (2013.01); *B32B 2264/1021* (2020.08); *B32B 2270/00* (2013.01); *B32B 2272/00* (2013.01); *B32B 2307/21* (2013.01); *B32B 2307/518* (2013.01); *B32B 2307/558* (2013.01); *B32B 2439/70* (2013.01); *B32B 2439/80* (2013.01); *C08J 2367/02* (2013.01); *C08J 2433/00* (2013.01); *C08J 2467/02* (2013.01); *C08J 2475/00* (2013.01); *C08L 2203/16* (2013.01); *C08L 2203/30* (2013.01); *C08L 2205/025* (2013.01); *C08L 2207/20* (2013.01)

(56) References Cited

U.S. PATENT DOCUMENTS

| | | | |
|---|---|---|---|
| 2002/0167111 | A1 | 11/2002 | Tsunekawa et al. |
| 2002/0187340 | A1* | 12/2002 | Posey ................. C08J 7/0427 428/522 |
| 2004/0086734 | A1 | 5/2004 | Janssens et al. |
| 2006/0228504 | A1* | 10/2006 | Wilkie ................. B32B 15/085 428/354 |
| 2012/0088112 | A1 | 4/2012 | Ito et al. |
| 2016/0160070 | A1* | 6/2016 | Kothari ............... C08L 23/0869 428/483 |
| 2017/0368807 | A1 | 12/2017 | Sakellarides et al. |
| 2018/0272679 | A1* | 9/2018 | Sakamoto ............ B29C 55/005 |

OTHER PUBLICATIONS

International Search Report and Written Opinion for International Application No. PCT/IN2019/050406 dated Jul. 18, 2019. 8 pages.

\* cited by examiner

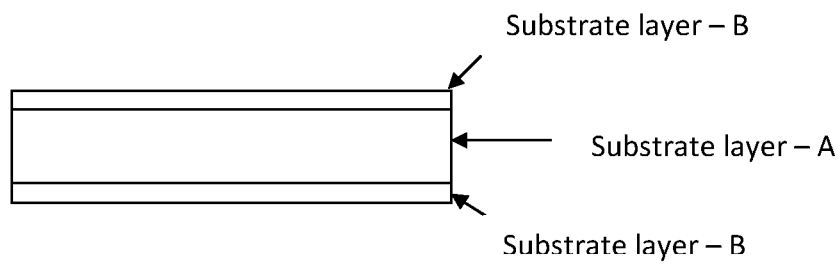
FIGURE 1: Transversal section view of the biaxially oriented formable polyester film
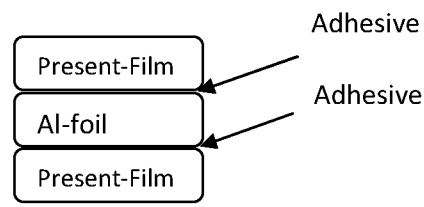
FIGURE 2: Laminate using present inventive film
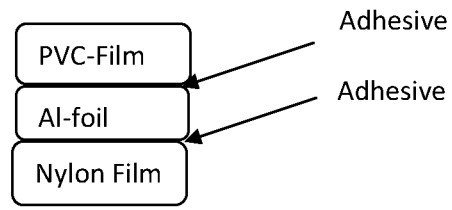
FIGURE 3: Laminate currently known in the art

BIAXIALLY ORIENTED FORMABLE POLYESTER FILM

CROSS-REFERENCE TO RELATED APPLICATIONS

This application is a U.S. National Stage Application under 35 U.S.C. § 371 of International Application No. PCT/IN2019/050406, filed May 22, 2019, which application claims the benefit of Indian Patent Application number 201811029971, filed Aug. 9, 2018, each of which is hereby incorporated by reference in its entirety.

FIELD OF THE INVENTION

The present disclosure relates to biaxially oriented formable polyester film. In particular, the disclosed subject matter relates to a biaxially oriented formable polyethylene terephthalate (PET) films that are capable of thermoforming or cold-forming having multilayer layer structure. The present disclosure also relates to a method of making and using the biaxially oriented formable polyester films. In particular, relates to the method of making and using the biaxially oriented PET films that are capable of thermoforming or cold-forming.

BACKGROUND AND PRIOR ART

It is well known in the industry to package articles such as food products or pharmaceuticals in multilayer films or laminates to protect the packaged product from mishandle and exterior contamination. The multilayer films or laminates provide convenient and durable packages for safe transportation and delivery to the end user. One such multilayer film or laminates prepared therefrom known in the art in packaging industry, pharmaceutical industry etc. are biaxially oriented formable polyester film, more particularly thermoformable or cold-forming biaxially oriented polyethylene terephthalate (BOPET) films. These films are produced by sequential biaxial orientation of the extrudate. Different types of biaxially oriented formable polyester film and processes to prepare these films have been disclosed in the prior art.

For instance, the document WO2016205682A1 discloses a biaxially-oriented PET film that are capable of cold forming and of thermoforming by utilizing blends of PET with other materials to improve the molding process. The films comprise polyethylene terephthalate layer includes one or more diacids, diols, or combinations thereof. The document further discloses that polyethylene terephthalate co-polyester can be obtained from recycled content bottle resin (i.e. recycled PET or rPET) can be utilized to enhance the draw properties of the film. However, the disclosed film when subjected to metaphase process conditions induce amorphous nature leading to high shrinkage at high temperature. Such shrinkage at high temperature leads to wastage due to inefficient utilization of the process. Some other drawbacks of the disclosed film are non-uniform drawability leading to distorted shape which in turn leads to poor appearance.

Another document JP2007168148A discloses a three-layer laminated film which is capable of forming thin metal film and used as a metal like molded member wherein metal compound is vapor deposited on at least one surface of the film. The film has layer A made of polyester A and a layer B made of polyester B which are laminated in an A/B/A type. The laminated film has a layer A comprising polyester A having an ethylene terephthalate unit as the main constituent component whereas the layer B comprises polyester B having a polybutylene terephthalate resin or a polytrimethylene terephthalate or their combination. However, the drawback of the film is that the haze of the film has to be within the 0.01 to 0.2%/μm, if the said range exceeds 0.2%/μm, the appearance of the film becomes cloudy and the appearance is compromised. On the other hand, when the film haze is less than 0.01%/μm, handling of the film becomes difficult, scratches or the like are formed on the film surface, wrinkles are formed when the film is wound into a roll shape.

In yet another document WO2006104116A a biaxially oriented polyester film includes at least three polyester resin layers A1/B/A2, and has a melting point in the range of 246 to 270° C. The disclosed film demonstrates high dimensional stability at high temperatures in order to form uniform metal deposition. The film is useful as material for formed parts with a plated metal-like appearance Another document KR2012072484A discloses biaxially stretched polyester film which comprises an excellent moldability, by imparting the balance of low strength and high elongation along a random direction. The biaxially oriented polyester film with an excellent moldability and made of aromatic dicarboxylic acid component (such as terephthalic acid or PTA) and at least one which includes the aliphatic glycol component (such as ethylene glycol, the neopentyl glycol, 1,4-cyclohexane dimethanol, the diethylene glycol).

The biaxially oriented PET films and methods to prepare the said films disclosed above suffer from major drawbacks such as: the film has high shrinkage, under pressure or vacuum forming the films do not retain the elongation and other useful properties, do not exhibit good dimensional stability, the films disclosed in the prior art do not provide the uniform shape and drawability during forming, uniform wall thickness in all direction, formability, dart impact and puncture resistance etc. The present disclosure addresses one or more problems as discussed above and other problems associated with the art of the reported films and the processes for their preparation. Thus, there is a need to develop biaxially oriented PET films which will have the desired set of properties (such as dart impact, puncture resistance, elongation etc.) and can overcome the drawbacks of the known PET films in the art.

SUMMARY OF THE INVENTION

The present disclosure provides biaxially oriented formable polyester film having the multilayer structure such as A/B/A characterized in that layer A comprises polyethylene terephthalate copolymer and inorganic filler and the layer B comprises polyethylene terephthalate copolymer and recycled-PET (or rPET). The film comprises at least two outer layer A. The disclosed film is capable of thermoforming above its glass transition temperature (Tg) and below its melting temperature (Tm) and capable of cold forming at ambient temperature and pressure conditions. The film has a thickness in the range of 8 to 300 micron and exhibits a dart impact of 150 gf or greater and puncture resistance of 4.0N or greater. More preferably, the dart impact is 150 gf to 1000 gf and puncture resistance is 4 to 12N.

The present disclosure further provides a process for preparing the biaxially oriented formable polyester film by sequential biaxial orientation of extrudate to produce multilayer structure such as A/B/A. The film's longitudinal draw is over a series of precision motorized rollers at a temperature range of 70° C. to 110° C. of surface of heat roll and stretch ratio in the range of 1.5 to 4.0 whereas the film's transverse or sideways draw uses diverging clips in a multiple zoned oven with tightly controlled temperature range of 90° C. to 125° C. and the stretch ratio in the range of 3.0-5.0.

The biaxially oriented formable polyester film of the present invention are suitable for replacement of nylons, biaxial oriented polyamide (BOPA) and multilayer PE film with nylon. Since, the disclosed films of the invention are capable of thermoforming they are suitable for pharma packaging and food packaging applications as such or in laminate structure. Furthermore, they are applicable for cold forming and therefore suitable for capsules/tablets packaging as such or in laminate structure.

BRIEF DESCRIPTION OF FIGURES

FIG. 1. Shows the transversal section view of the biaxially oriented formable polyester film of the present invention.

FIG. 2. Shows laminate prepared using the polyester film of the present Invention.

FIG. 3. Shows laminate known in the prior art

DETAILED DESCRIPTION

While the invention is susceptible to various modifications and alternative forms, specific aspect thereof has been shown by way of example and will be described in detail below. It should be understood, however that it is not intended to limit the invention to the particular forms disclosed, but on the contrary, the invention is to cover all modifications, equivalents, and alternative falling within the spirit and the scope of the invention.

The Applicants would like to mention that the examples are mentioned to show only those specific details that are pertinent to understanding the aspects of the present invention so as not to obscure the disclosure with details that will be readily apparent to those of ordinary skill in the art having benefit of the description herein.

The terms "comprises", "comprising", or any other variations thereof, are intended to cover a non-exclusive inclusion, such that a process that comprises a list of components does not include only those components but may include other components not expressly listed or inherent to such process. In other words, one or more elements in a system or process proceeded by "comprises . . . a" does not, without more constraints, preclude the existence of other elements or additional elements in the system or process.

Accordingly, one aspect of the present disclosure is to provide a biaxially oriented formable polyester film and the method of making and using the formable films. In particular, the present disclosed subject matter includes a biaxially oriented polyethylene terephthalate (PET) films. The disclosed films are capable of thermoforming or cold-forming and can be used as such in a laminate structure. The biaxially oriented formable polyester film in particular include a multilayer structure such as A/B/A.

In some embodiments, the biaxially oriented formable polyester film according to the disclosure has one or more layers comprising of polyethylene terephthalate (PET), recycled polyethylene terephthalate (rPET) and inorganic filler.

In some embodiments, the biaxially oriented formable polyester film in particular include a multilayer structure such as A/B/A wherein the A-layer comprises polyethylene terephthalate layers of the film and contains inorganic filler.

In some embodiments, the biaxially oriented formable polyester film in particular include a multilayer structure such as A/B/A wherein the B-layer comprises polyethylene terephthalate layers of the film and contains recycled PET (rPET).

In some embodiments, presently disclosed biaxially oriented formable polyester film is made of polyethylene terephthalate (PET) wherein the polyethylene terephthalate is selected from a polyethylene terephthalate co-polymer.

Furthermore, in some embodiments, at least one of the biaxially oriented polyethylene terephthalate layers contains inorganic filler, more preferably at least two of the polyethylene terephthalate layers of the film contains inorganic filler, most preferably the two of the polyethylene terephthalate layers containing inorganic filler are the outermost layer of the film.

Further, in some embodiments at least one biaxially oriented layer of film contains polyethylene terephthalate and recycled PET (rPET), more preferably the layer containing polyethylene terephthalate and recycled PET (rPET) is sandwiched between the layers of polyethylene terephthalate copolymer containing inorganic filler. For example, the biaxially oriented formable films is made of polyethylene terephthalate (PET) include an A/B/A structure and wherein the A-layer contains inorganic filler or particle and wherein the B-layer contains rPET.

In some embodiments, polyethylene terephthalate copolymer utilized for preparing the biaxially oriented formable polyester film is made of dicarboxylic acid monomers and diol monomers.

Some of the dicarboxylic acid monomers useful for preparing the polyester resin of biaxially oriented formable polyester film of the present invention, for example, include aromatic dicarboxylic acids monomers such as terephthalic acid (PTA), 2,6-naphthalene dicarboxylic acid, isophthalic acid (IPA) or aliphatic dicarboxylic acid monomer such as adipic acid or ester of same or combination thereof.

Similarly, some of the glycol or diol monomers useful for preparing polyethylene terephthalate copolymer of biaxially oriented formable polyester film of the present invention, for example, include aliphatic dihydroxy compounds such as ethylene glycol (EG), diethylene glycol (DEG), propylene glycol, butanediol, hexanediol, neopentyl glycol (NPG), cyclohexanedimethanol (CHDM), trans-1,4-cyclohexanediol, cis-1,4-cyclohexanediol or combination thereof.

In yet another embodiment, the dicarboxylic acid monomer in the polyester resin is about 40-70 wt. % or more of the total dicarboxylic acid monomer in the polyester resin in the layer A or layer B. More particularly, the dicarboxylic acid monomer in the polyester resin is about 60-70 wt. % or more.

In yet another embodiment, the glycol or diol monomer in the polyester resin is about 30-60 wt. % or less of the total diol monomer in the polyester resin in the layer A or layer B. More particularly, the diol monomer in the polyester resin is about 30-40 wt. % or less.

In another embodiment, the inorganic fillers or particles that can be added to the biaxially oriented formable polyester film include, but not limited to wet type or dry type silica, colloidal silica, aluminum silicate, titanium oxide, calcium carbonate, calcium phosphate, barium sulfate, aluminum oxide, mica, kaolin, and clay. In a preferable embodiment, the inorganic filler silica has dosage in the range of 500 to 3500 ppm, more preferably 750 to 2500 ppm, most preferably 1000-1500 ppm. In particular, inorganic fillers are wet type or dry type silica having the quantity of 1000 ppm to 2000 ppm.

In another embodiment, 15-35 wt % of the recycled PET (rPET) and remaining polyethylene terephthalate (PET) was added to layer-B for preparing the biaxially oriented formable polyester film according to present disclosure. The rPET is obtained from inhouse polyester films recycle and/or material obtained from other sources like post consumable PET recycles.

In yet another embodiment, the biaxially oriented formable polyester film is optionally coated with an acrylic coating, polyurethane coating, co-polyester-based coating or antifog coating.

In yet another embodiment, the biaxially oriented formable polyester film is optionally coated with an antistatic coating to get surface resistivity of film less than 1012 Ohm.

In yet another embodiment, the biaxially oriented formable polyester film is optionally coated with SiOx and AlOx layer or using polyvinyl alcohol (PVOH) or ethylene vinyl alcohol (EVOH) or combination thereof to provide oxybarrier properties.

Another aspect of the present invention is to provide a process for preparing the biaxially oriented formable polyester film by sequential biaxial orientation of extrudate and having a multilayer structure such as A/B/A. The process includes the following steps:
a. Charging the blended PET from main extrusion and silica containing PET from sub-extrusion to obtain molten polyester.
b. Extruding the said molten polyester through a die and quenching the same on chilled rollers in order to obtain transparent polyester film;
c. Stretching the films in longitudinal and transverse directions
wherein the film's longitudinal draw is over a series of precision motorized rollers at a temperature range of 70° C. to 110° C. of surface of heat roll, the stretch ratio in the range of 1.5 to 4.0; and
wherein the transverse or sideways draw uses diverging clips in a multiple zoned oven with tightly controlled temperature range of 90° C. to 125° C. and the stretch ratio in the range of 3.0-5.0;
d. Subjecting the stretched films to annealing at temperature range of 200° C. to 230° C., more preferable at temperature range of 200 to 225° C., most preferable at temperature range of 200 to 220° C.

The blended PET charged from the main extrusion comprises of PET along with rPET.

In some embodiments, the process includes: a step of stretching the one or more biaxially-oriented polyethylene terephthalate layers in a longitudinal direction at a temperature range of 70° C. to 110° C. of surface of heat roll and a step of stretching the one or more biaxially-oriented polyethylene terephthalate layers in a transverse direction at a temperature range of 90° C. to about 125° C. The stretch ratio for longitudinal draw is in the range of 1.5 to 4.0 and the stretch ratio for transverse or sideways draw is in the range of 3.0-5.0 followed by annealing the stretched films at temperature range of 200° C. to 230° C., more preferable at temperature range of 200 to 225° C., most preferable at temperature range of 200 to 220° C.

In some embodiments of the present disclosure, the biaxially oriented formable polyester film or layers are capable of thermoforming or cold-forming.

The term "thermoforming" and variations thereof as used herein refer to pressure forming, vacuum forming, matched die forming.

The term "cold-forming" and variations thereof as used herein refer to drawing without being subjected to heat.

In yet another embodiment, the temperature window for thermoforming is above glass transition temperature (Tg) and below melting temperature (Tm) of biaxially oriented formable polyester film.

In yet another embodiment, the Tg refers to glass transition temperature of biaxially oriented formable polyester film of the invention which has the value in the range of 69 to 80° C.

In yet another embodiment, the Tm refers to melting temperature of biaxially oriented formable polyester film of the invention which has the value in the range of 240 to 260° C. In yet another embodiment, the cold forming of biaxially oriented formable polyester film is done at ambient temperature and pressure conditions.

The term "ambient conditions" and variations thereof as used herein refer to room conditions.

In another embodiment, the biaxially oriented formable polyester film disclosed in the present invention has the property of dart impact of 150 gf or greater, more preferably 450 gf or greater, most preferably 700 gf or greater; draw ratio of 0.2 or greater, more preferably 0.5 or greater, most preferably 0.8 or greater; puncture resistance of 4.0N or greater, more preferably 8.0N or greater, most preferably 12N or greater and elongation of 140% or greater, more preferably 170% or greater, most preferably 200% or greater.

In another embodiment, the biaxially oriented formable polyester film disclosed in the present invention has the property of dart impact of 150 gf to 1000 gf; draw ratio of 0.2 to about 0.8; puncture resistance of 4 N to 12N and machine or transverse direction elongation of 140 to 250%.

In some embodiments, the presently disclosed biaxially oriented formable polyester film can be made in a varied range of thickness. The thickness of the biaxially oriented polyester film disclosed in the present subject matter is between 8-300μ. More particularly, when the film has an A/B/A layer structure, the B-layer has thickness in the range of 65% to 95%, more particularly 75-85% of the total thickness of the polyester film and the A-layer thickness in the range of 10% to 30%, more particularly 15-25% (7.5-12.5% of each layer A-layer) of the total thickness of the polyester film.

The disclosed biaxially oriented formable polyester film have high dart impact and puncture resistance properties and are capable of being used as replacement for nylon, nylon like biaxial oriented polyamide (BOPA) and multilayer PE film with nylon. Nylon film have puncture resistance 6.0-8.0 N and/or dart impact 250-650 gf and are useful for pharma, food packaging and industrial packaging applications.

It is yet another object of the present invention to provide biaxially oriented formable polyester films that can be configured into a desired shape under cold forming or thermoforming. In some embodiments, the biaxially oriented formable polyester film are particularly useful for pharma-packaging application, more particularly, blister packaging such as for tablets and capsules as such or in laminate structure. In some embodiments, the biaxially oriented formable polyester film are particularly useful for food packaging application as such or in laminate structure.

Further salient features of the biaxially oriented formable polyester film and enhancements are discussed in the examples provided below.

Characterization of Biaxially Oriented Formable Polyester Film

Measurement of Tg, Tc and Tm:

The Tg (glass transition temperature), Tc (crystallization temperature) and Tm (melting temperature) of the inventive film were studied using Differential Scanning calorimeter (DSC) (Shimadzu model DSC-60).

The film was heated from 30° C. to 300° C. at a rate of 10° C./min. in nitrogen atmosphere with a flow rate of 40 ml/min.

The polyester film of present invention on first heating showed an exothermic peak in the range of 72-110° C. with a value of $\Delta Hr=12-20$ J/g, and an endothermic peak at 240-260° C. with an melting enthalpy of 46-50 J/g.

The DSC crystallization point corresponds to the temperature at which the exothermal crystallization peak is at its maximum.

The DSC melting point corresponds to the temperature at which the endothermic melting peak is at its maximum.

The above mentioned maximum exothermic peak represents a crystallization point existing in the film and above mentioned maximum endothermic melting peak represents a melting point existing in the film.

Dart Impact

The dart impact of the inventive film was studied using drop dart impact tester as per standard ASTM D1709.

Depending upon the expected impact strength of the test sample, either Method A or Method B is chosen. The method defines the dart size and the drop height for the dart. A number of test samples are then impacted to determine an appropriate starting point for the weight of the dart.

The method to analyze this test data is called the "Bruceton Staircase" method. A series of 20 to 25 impacts are conducted. If a test specimen passes, the drop weight is increased by one unit. If a test specimen fails, the drop weight is decreased by one unit. The results from these impacts are used to calculate the Impact Failure Weight—the point at which 50% of the test specimens will fail under the impact.

Test method A specifies a dart with a 38 mm (1.5") diameter dropped from 0.66 m (26")

Test method B specifies a dart with a 51 mm (2") diameter dropped from 1.5 m (60")

We used the Method A to test the dart impact of the inventive biaxially oriented formable polyester film.

Film specimen for the dart impact testing that can be cut to 230 mm×230 mm (9"×9") specimens. A minimum of 30 specimens are required for the test.

Puncture Resistance

The puncture resistance of the inventive film was studied using standard ASTM F1306-16 for slow rate penetration resistance of flexible films and laminates.

Penetration resistance is an important end-use performance of thin flexible films where a sharp-edged product can destroy the integrity of a barrier wrap. This will permit package entry/exit of gases, odors, and unwanted contaminates, causing potential harm to the product and reducing shelf-life. Material response to penetration will vary with numerous factors, such as film thickness, elastic modulus, rate of penetration, temperature, shape and type of probe. Consequently, material responses from puncture to stretch may be observed and quantified using this method.

The test is performed at room temperature, by applying a biaxial stress at a single test velocity on the sample until perforation occurs. The force, energy, and elongation to perforation are determined.

EXAMPLES

The following examples are given to illustrate the present invention and should not be construed to limit the scope of the present invention.

Accordingly, the biaxially oriented formable polyester film prepared by using the sequential biaxial orientation of the extrudate to produce an A/B/A layer structure film wherein each layer having the specific composition is provided below. The B-layer thickness is 85% and the A-layer is 15% (7.5% of each A-layer) of the total thickness of the polyester film.

The examples 1~4 provide composition of respective constituents in each layer of the biaxially oriented formable polyester film Example 1

| Film Grade | Layer Structure | Raw Material Name | Composition (wt %) |
|---|---|---|---|
| A/B/A Layer | Layer-A | 1500 ppm Silica + PET | 1500 ppm Silica + PET (68% PTA + 24.5% EG + 3% NPG + 4%CHDM + 0.5% DEG) |
| | Layer-B | PET + rPET | 75% PET (68% PTA + 24.5% EG + 3% NPG + 4% CHDM + 0.5% DEG) + 25% rPET |
| | Layer-A | 1500 ppm Silica + PET | 1500 ppm Silica + PET (68% PTA + 24.5% EG + 3% NPG + 4% CHDM + 0.5% DEG) |

Example 2

| Film Grade | Layer Structure | Raw Material Name | Composition (wt %) |
|---|---|---|---|
| A/B/A Layer | Layer-A | 1500 ppm Silica + PET | 1500 ppm Silica + PET (68% PTA + 22.5% EG + 4% NPG + 5% CHDM + 0.5% DEG) |
| | Layer-B | PET + rPET | 75% PET (68% PTA + 22.5% EG + 4% NPG + 5% CHDM + 0.5% DEG) + 25% rPET |
| | Layer-A | 1500 ppm Silica + PET | 1500 ppm Silica + PET (68% PTA + 22.5% EG + 4% NPG + 5% CHDM + 0.5% DEG) |

Example 3

| Film Grade | Layer Structure | Raw Material Name | Composition (wt %) |
|---|---|---|---|
| A/B/A Layer | Layer-A | 1500 ppm Silica + PET | 1500 ppm Silica + PET (68% PTA + 20.5% EG + 5% NPG + 6% CHDM + 0.5% DEG) |
| | Layer-B | PET + rPET | 75% PET (68% PTA + 20.5% EG + 5% NPG + 6% CHDM + 0.5% DEG) + 25% rPET |
| | Layer-A | 1500 ppm Silica + PET | 1500 ppm Silica + PET (68% PTA + 20.5% EG + 5% NPG + 6% CHDM + 0.5% DEG) |

Example 4

| Film Grade | Layer Structure | Raw Material Name | Composition (wt %) |
|---|---|---|---|
| A/B/A Layer | Layer-A | 1500 ppm Silica + PET | 1500 ppm Silica + PET (68% PTA + 18.5% EG + 6% NPG + 7% CHDM + 0.5% DEG) |
| | Layer-B | PET + rPET | 75% PET (68% PTA + 18.5% EG + 6% NPG + 7% CHDM + 0.5% DEG) + 25% rPET |
| | Layer-A | 1500 ppm Silica + PET | 1500 ppm Silica + PET (68% PTA + 18.5% EG + 6% NPG + 7% CHDM + 0.5% DEG) |

Example 5

| Film Grade | Layer Structure | Raw Material Name | Composition (wt %) |
|---|---|---|---|
| A/B/A Layer | Layer-A | 1500 ppm Silica + PET Chips | 1500 ppm Silica + (65.5% PTA + 2.5% IPA + 32% EG) |
| | Layer-B | PET Chips + rPET Chips | 75% PET Chips (65.5% PTA + 2.5% IPA + 32% EG) + 25% rPET Chips |
| | Layer-A | 1500 ppm Silica + PET Chips | 1500 ppm Silica + (65.5% PTA + 2.5% IPA + 32% EG) |

The biaxially oriented formable polyester film of different thickness (such as 19u, 23u or 36u) and having the A/B/A layer structure based on the different compositions of the inventive examples 1~4 and reference film (Normal PET is an A/B/A type film wherein the layers of the film do not contain NPG, CHDM or DEG) were produced by a range of processing parameters as follows: MDO stretching temperature: 80-85° C.; TDO crystallizing Temperature: 225-240° C.; MDO Draw Ratio: 3-3.5; TDO Stretching Temperature: 90-115° C.; TDO Draw Ratio: 3.8-4.5.

The properties of the biaxially oriented formable polyester film of different thickness (such as 19u, 23u or 36u) and having the A/B/A layer structure based on the different compositions of the invention (Examples 1-4) are provided below:

TABLE 1

Properties of the biaxially oriented formable polyester film of different thickness

| Examples | Thickness (μ) | MD Elongation (%) | TD Elongation (%) | Puncture Resistance (N) | Dart Impact (gf) |
|---|---|---|---|---|---|
| Example 1 | 19 | 160 | 140 | 4.9 | 255 |
| Example 2 | | 165 | 145 | 4.75 | 260 |
| Example 3 | | 170 | 150 | 4.6 | 265 |
| Example 4 | | 175 | 155 | 4.4 | 270 |
| Example 1 | 23 | 170 | 150 | 6.05 | 350 |
| Example 2 | | 175 | 155 | 5.9 | 355 |
| Example 3 | | 180 | 160 | 5.75 | 360 |
| Example 4 | | 185 | 165 | 5.5 | 365 |
| Example 1 | 36 | 180 | 160 | 7.15 | 650 |
| Example 2 | | 185 | 165 | 7 | 660 |
| Example 3 | | 190 | 170 | 6.85 | 670 |
| Example 4 | | 195 | 175 | 6.5 | 680 |

The developed thermoformable film has the properties of dart impact and puncture resistance comparative to nylon film as shown below which are useful for the cold forming properties.

TABLE 2

Properties of comparative nylon film

| Film Grade | Thickness (μ) | MD/TD Elongation (%) | Puncture Resistance (N) | Dart Impact (gf) |
|---|---|---|---|---|
| BOPA | 15 | 90-150/90-130 | 6.35 | 255 |
| | 25 | 90-150/90-130 | 7.8 | 600 |

As evident from the Table 1 & Table 2 the dart impact and puncture resistance properties of the thermoformable PET film having an A/B/A layer structure provided by the present invention have comparable values with that of the nylon (BOPA: biaxial oriented polyamide) films.

Further, a comparison of the properties (Table 3) of the films provided by the present invention and the normal PET films prepared under similar processing conditions are studied to exemplify the present invention.

As evident from table 3 below the biaxially oriented formable polyester film having the A/B/A layer structure disclosed in the present application demonstrate better puncture resistance (N) and dart impact (gf) in comparison to reference normal PET film having the same A/B/A layer structure but without the NPG, CHDM or DEG (in layer A and layer B respectively) and produced under similar processing conditions.

TABLE 3

Comparison of the properties of the biaxially oriented thermoformable film of the invention with normal PET film

| | Thermoformable film | Normal PET film | Thermoformable film | Normal PET film | Thermoformable film | Normal PET film |
|---|---|---|---|---|---|---|
| Layer Structure | A/B/A | A/B/A | A/B/A | A/B/A | A/B/A | A/B/A |
| Thickness (mic) | 19μ | 19μ | 23μ | 23μ | 36μ | 36μ |
| MD Elongation (%) | 160 | 140 | 170 | 140 | 180 | 140 |
| TD Elongation (%) | 140 | 130 | 150 | 130 | 160 | 130 |
| MD Shrinkage (%) at 150° C. for 30 min. | 2 | 1.6 | 1.8 | 1.6 | 1.6 | 1.6 |

TABLE 3-continued

Comparison of the properties of the biaxially oriented thermoformable film of the invention with normal PET film

|  | Thermo-formable film | Normal PET film | Thermo-formable film | Normal PET film | Thermo-formable film | Normal PET film |
|---|---|---|---|---|---|---|
| TD Shrinkage (%) at 150° C. for 30 min. | 1.8 | 0.2 | 1.6 | 0.2 | 1.4 | 0.2 |
| Puncture Resistance (N) | 4.9 | 4 | 6.05 | 5 | 7.15 | 6.15 |
| Dart Impact (gf) | 255 | 220 | 350 | 300 | 650 | 550 |

The disclosed polyester film of the invention is also utilized to prepare laminated packaging materials wherein the laminate film structure comprises polyester film layer prepared according to the present invention, an aluminum foil layer sandwiched between the biaxially-oriented polyester film and comprising an adhesive between the polyester film and aluminum foil layers (FIG. 2) wherein the laminate film example 1-4 utilize polyester film having composition as defined above respectively. A comparative laminate film was prepared comparative laminate film structure comprises normal polyester film layer as defined above, an aluminum foil layer sandwiched between the normal polyester film and comprising an adhesive between the polyester film and aluminum foil layers (FIG. 3). The comparative laminate film represented by comparative example 1-3 (Table 4) have the thickness 9, 23 and 36 micron respectively. Both the laminates were subjected to cold deep drawing at normal room temperature using a die rectangular in the plane view (5 mm-by-10 mm). The laminated packaging materials were each subjected to the above described deep drawing ten times, and frequency of defects such as pinhole and crack was counted. The results based on the number of defects the laminates were rated and have been provided in the Table 4.

TABLE 4

Comparison of the defects observed in a laminate comprising the biaxially oriented polyester film of the invention and normal polyester film.

| Examples | Cold Formability |
|---|---|
| Example 1 | A |
| Example 2 | A |
| Example 3 | A |
| Example 4 | A |
| Comparative Example 1 | D |
| Comparative Example 2 | D |
| Comparative Example 3 | C |

A = No defect observed at any of the ten times;
B = Defect was observed once or twice out of the ten times;
C = Defect was observed three to five times;
D = Defect observed was six times or more.

The advantages of the disclosed invention are thus attained in an economical, practical and facile manner. While preferred embodiments and example have been shown and described, it is to be understood that various further modifications and additional configurations will be apparent to those skilled in the art. It is intended that the specific embodiments herein disclosed are illustrative of the preferred and best modes for practicing the invention and should not be interpreted as limitations on the scope of the invention.

The invention claimed is:

1. A biaxially oriented formable polyester film comprising
    layer A comprising a polyethylene terephthalate copolymer and inorganic filler silica having dosage of greater than 1000 to 3500 ppm;
    layer B comprising 90 to 60 wt. % polyethylene terephthalate copolymer and 10 to 40% recycled-PET; wherein layer B has a thickness of 75% to 85% of the total thickness of the film;
    wherein the film comprises two outer layers made of layer A, and each layer A has a thickness of 7.5% to 12.5% of the total thickness of the film;
    wherein the film has a thickness in the range of 8 to 300 micron; and
    wherein the film exhibits a dart impact of 150 gf or greater and puncture resistance of 4.0N or greater.

2. The biaxially oriented formable polyester film as claimed in claim 1, wherein the polyethylene terephthalate copolymer of layer A comprises aromatic dicarboxylic acid monomer selected from terephthalic acid, 2,6 naphthalene dicarboxylic acid, and isophthalic acid, or aliphatic dicarboxylic acid monomer selected from adipic acid and ester of same, or combination thereof, and diol selected from ethylene glycol, neopentyl glycol, cyclohexanedimethanol, diethylene glycol, propylene glycol, butanediol, hexanediol, trans-1,4 cyclohexanediol, and cis-1,4-cyclohexanediol or combination thereof.

3. The biaxially oriented formable polyester film as claimed in claim 2, wherein the polyethylene terephthalate copolymer of layer A comprises 40 to 70 wt. % of aromatic or aliphatic dicarboxylic acid.

4. The biaxially oriented formable polyester film as claimed in claim 2, wherein the polyethylene terephthalate copolymer of layer A comprises 30 to 60 wt. % of diol.

5. The biaxially oriented formable polyester film as claimed in claim 2, wherein the polyethylene terephthalate copolymer of layer A comprises 50 to 70 wt. % of aromatic or aliphatic dicarboxylic acid.

6. The biaxially oriented formable polyester film as claimed in claim 2, wherein the polyethylene terephthalate copolymer of layer A comprises 60 to 70 wt. % of aromatic or aliphatic dicarboxylic acid.

7. The biaxially oriented formable polyester film as claimed in claim 2, wherein the polyethylene terephthalate copolymer of layer A comprises 30 to 50 wt. % of diol.

8. The biaxially oriented formable polyester film as claimed in claim 2, wherein the polyethylene terephthalate copolymer of layer A comprises 30 to 40 wt. % of diol.

9. The biaxially oriented formable polyester film as claimed in claim 1, wherein the polyethylene terephthalate copolymer of layer B comprises aromatic dicarboxylic acid monomer selected from terephthalic acid, 2,6-naphthalene dicarboxylic acid, and isophthalic acid, or aliphatic dicarboxylic acid monomer selected from adipic acid or ester of same, or combination thereof, or diol selected from ethylene glycol, neopentyl glycol, cyclohexanedimethanol, diethylene glycol, propylene glycol, butanediol, hexanediol, trans-1,4 cyclohexanediol, and cis-1,4-cyclohexanediol, or combination thereof.

10. The biaxially oriented formable polyester film as claimed in claim 9, wherein the polyethylene terephthalate copolymer of layer B comprises 40 to 70 wt. % of aromatic or aliphatic dicarboxylic acid.

11. The biaxially oriented formable polyester film as claimed in claim 9, wherein the polyethylene terephthalate copolymer of layer B comprises 30 to 60 wt. % of diol.

12. The biaxially oriented formable polyester film as claimed in claim 9, wherein the polyethylene terephthalate copolymer of layer B comprises 60 to 70 wt. % of aromatic or aliphatic dicarboxylic acid.

13. The biaxially oriented formable polyester film as claimed in claim 9, wherein the polyethylene terephthalate copolymer of layer B comprises 30 to 50 wt. % of diol.

14. The biaxially oriented formable polyester film as claimed in claim 9, wherein the polyethylene terephthalate copolymer of layer B comprises 30 to 40 wt. % of diol.

15. The biaxially oriented formable polyester film as claimed in claim 1, wherein the inorganic filler silica is wet type or dry type silica.

16. The biaxially oriented formable polyester film as claimed in claim 1, wherein the film is optionally coated with an acrylic coating, polyurethane coating, co-polyester-based coating or anti-fog coating.

17. The biaxially oriented formable polyester film as claimed in claim 1, wherein the film is optionally provided with an antistatic coating to get surface resistivity of film less than 1012 Ohm.

18. The biaxially oriented formable polyester film as claimed in claim 1, wherein the biaxially oriented formable polyester film is coated with SiOx and AlOx.

19. The biaxially oriented formable polyester film as claimed in claim 1, wherein the biaxially oriented formable polyester film is coated with polyvinyl alcohol or ethylene vinyl alcohol, or a combination thereof.

20. The biaxially oriented formable polyester film as claimed in claim 1, wherein the film is capable of thermoforming at a temperature window above a glass transition temperature, Tg, and below a melting temperature, Tm, of biaxially oriented formable polyester film.

21. The biaxially oriented formable polyester film as claimed in claim 20, wherein the glass transition temperature, Tg, is 69° C. to 80° C.

22. The biaxially oriented formable polyester film as claimed in claim 20, wherein the melting temperature, Tm, is 230° C. or 240° C. to 260° C.

23. The biaxially oriented formable polyester film as claimed in claim 1, wherein the film is capable of cold forming at ambient conditions.

24. The biaxially oriented formable polyester film as claimed in claim 1, wherein the Dart impact of the film is 450 gf or greater.

25. The biaxially oriented formable polyester film as claimed in claim 1, wherein the puncture resistance of the film is 8.0N or greater.

26. The biaxially oriented formable polyester film as claimed in claim 1, wherein the layer B comprises 85 to 65 wt. % polyethylene terephthalate copolymer.

27. The biaxially oriented formable polyester film as claimed in claim 1, wherein the layer B comprises 70 to 80 wt. % polyethylene terephthalate copolymer.

28. The biaxially oriented formable polyester film as claimed in claim 1, wherein the layer B comprises 15 to 35 wt. % recycled PET.

29. The biaxially oriented formable polyester film as claimed in claim 1, wherein the layer B comprises 20 to 30 wt. % recycled PET.

30. The biaxially oriented formable polyester film as claimed in claim 1, wherein the polyethylene terephthalate copolymer of layer B comprises 50 to 70 wt. % of aromatic or aliphatic dicarboxylic acid.

31. The biaxially oriented formable polyester film as claimed in claim 1, wherein the layer A comprises inorganic filler silica having dosage of greater than 1000 to 2500 ppm.

32. The biaxially oriented formable polyester film as claimed in claim 1, wherein the layer A comprises inorganic filler silica having dosage of greater than 1000 to 1500 ppm.

33. The biaxially oriented formable polyester film as claimed in claim 1, wherein the Dart impact of the film is 700 gf or greater.

34. The biaxially oriented formable polyester film as claimed in claim 1, wherein the puncture resistance of the film is 12N or greater.

35. A packaging material comprising the biaxially oriented formable polyester film as claimed in claim 1.

36. The packaging material as claimed in claim 35, wherein the packaging material is in a laminate structure which comprises two layers of biaxially oriented formable polyester films as claimed in claim 1, with an aluminum foil layer between the two biaxially-oriented polyester films.

* * * * *